Sept. 24, 1929.  J. P. KOLAR  1,729,513
TROMBONE
Filed Dec. 15, 1928   2 Sheets-Sheet 1

John P. Kolar
INVENTOR.

BY
ATTORNEYS.

Sept. 24, 1929.  J. P. KOLAR  1,729,513
TROMBONE
Filed Dec. 15, 1928   2 Sheets-Sheet 2
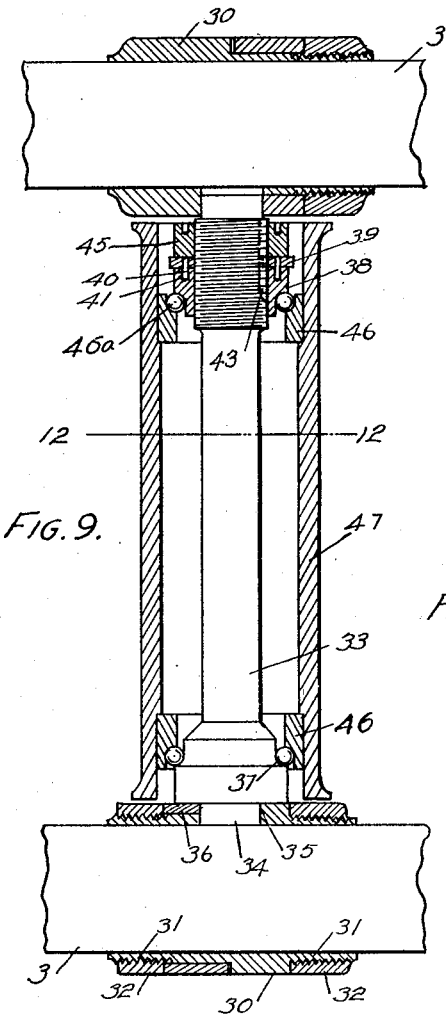
John P. Kolar
INVENTOR.
BY
ATTORNEYS.

Patented Sept. 24, 1929

1,729,513

UNITED STATES PATENT OFFICE

JOHN P. KOLAR, OF ERIE, PENNSYLVANIA

TROMBONE

Application filed December 15, 1928. Serial No. 326,239.

In the use of trombones the slide is usually handled by the operator through what is called a hand bar. In many instances the delicacy with which the slide may be handled is reflected in the excellence of the tone from the instrument. The present invention is designed to facilitate this handling by providing a rotative grip for the operator which not only permits of more delicate handling of the slide but also relieves some of the strain on the operator. Features and details of the invention will appear from the specification and claims.

Preferred embodiments of the invention are illustrated in the accompanying drawings as follows:—

Figure 1:
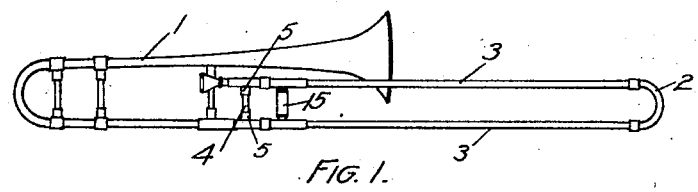

Fig. 1 shows a side elevation of a trombone.

Figure 2:
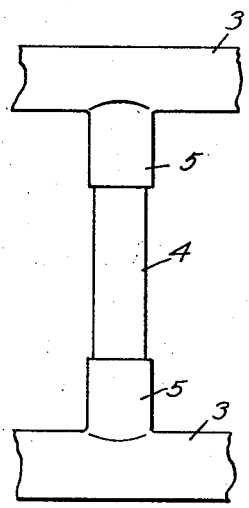

Fig. 2 an enlarged view of the ordinary handle bar used with such a trombone.

Figure 3:
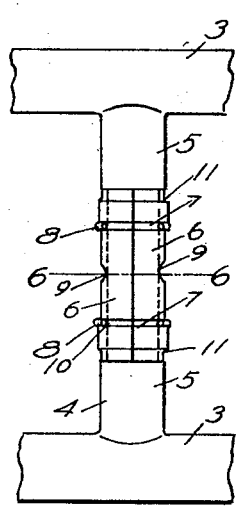

Fig. 3 a similar view with a bearing sleeve arranged on said bar.

Figure 4:
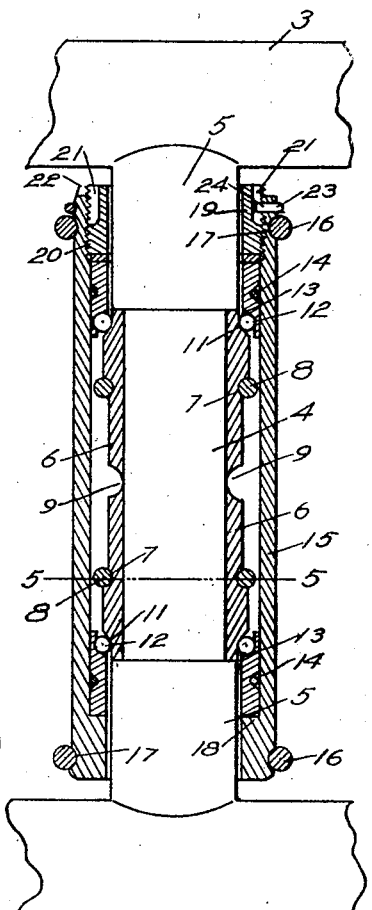

Fig. 4 an enlarged longitudinal section through the handle bar.

Figure 5:
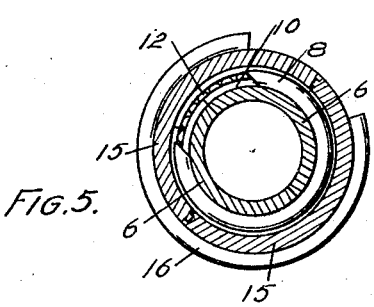

Fig. 5 a section on the line 5—5 in Fig. 4.

Figure 6:
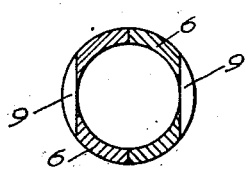

Fig. 6 a section on the line 6—6 in Fig. 3.

Figure 7:
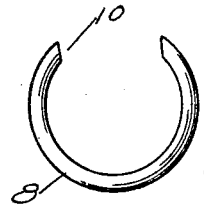

Fig. 7 a detached view of one of the securing rings.

Figure 8:
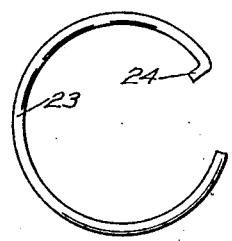

Fig. 8 a detached view of a locking ring.

Fig. 9 a longitudinal section of a modified form of handle bar.

Fig. 10 another modification.

Fig. 11 a section on the line 11—11 in Fig. 10.

Fig. 12 a section on the line 12—12 in Fig. 9.

Fig. 13 a detached view of a locking washer.

1 marks the trombone body, and 2 the slide, the slide comprising the parallel sliding tubes 3—3. The tubes 3—3 are connected by cross bars 4.

The cross bars are usually provided with enlarged ends 5 which facilitate the securing of these bars to the tubes 3. A split bearing sleeve 6 is arranged around the smaller part of the cross bar, the ends of the bearing sleeve engaging the enlargements 5. The sleeve is provided with annular grooves 7 in which are arranged split rings 8 clamping the sections, or parts of the sleeve on the bar 4. The bearing sleeve is provided with side notches 9 to facilitate the assembling of the split rings 8, the opening 10 in the ring being passed through these notches without spreading the ring materially.

Ball race ways 11 are arranged on the ends of the bearing sleeve and balls 12 operate on these race ways. Outer race ways 13 also split longitudinally operate on the balls. The race ways 13 are secured together by split rings 14 and are also arranged within a tubular hand bar 15. The parts of the tubular hand bar are secured together by split rings 16 and operate in grooves 17 on the tubular hand bar sections. One end of the tubular hand bar has the internal shoulder 18 engaging an outer race way. The opposite end of the tubular hand bar is internally screw threaded at 20 and an adjusting nut 19 is screwed into the tubular hand bar 15 against the outer race way to adjust the ball bearing. The screw is provided with slots 21. The hand bar has a groove 22 and a key ring 23 is arranged in this groove. One end of the key ring has an inner projection 24 which extends into the slot 21 of the screw 19 locking it in adjustment.

It will readily be seen that with this structure in place, the operator gripping the hollow handle bar can operate the slide, the handle bar turning on the cross bar to accommodate the turning movements of the hand of the operator. The split construction permits of the mounting of this structure on instruments already in use.

In Fig. 9 I have shown a modification. In this there are sleeves 30 on the parallel tubes 3. These sleeves 30 have slots 31 at their ends rendering these ends contractible. Nuts 32 are arranged on these slotted ends and contract the sleeves so as to clamp them on to the tubes. The sleeve is provided with a notch 35 and is opposed by a notched ring 36, forming a perforation receiving an extension 34 of a cross pin 33. The cross pin is provided with a fixed race-way 37 at one end and an adjustable race-way 38 at the opposite end. A key washer 39 has pins 40 which extend into perforations 41 in the race way 38 and also a key projection 42 which extends into a slot 43 in the cross bar. The cross pin 33 is screw threaded and a nut 45 is arranged on the screw threads operating against the lock washer 34 to adjust the bearing. Race ways 46 operate on balls 46ª between the race ways 46, 37 and 38. The race ways 46 are arranged in a hollow handle bar 47. The operation of the structure is similar to that of the structure shown in Fig. 4.

In Fig. 10 another modification is shown. A sleeve 48 is notched at 49. A ring 50 is also notched and arranged on the sleeve 48, the notch 49 with the ring 50 clamping a ball bearing 51 between them. The sleeve is slotted at 52 rendering it contractible and a nut 53 is arranged on this end of the sleeve contracting the sleeve into clamping engagement with the tube 3 and forcing the ring 50 against the ball bearing and clamping the ball bearing between the walls of the notch 49 and the ring 50.

A hand bar 54 is provided with extending ends 55 which extend into the inner member of the ball bearing 51. This device operates in the same manner as the preceding devices.

The sectional contour of the cross bar makes a more satisfactory grip for the fingers in some respects than the ordinary cross bar. Different contours may be used, if desired.

What I claim as new is:—

1. In a trombone, the combination with a slide having parallel tubes of a hand bar between the tubes and rotatively mounted relatively to the tubes.

2. In a trombone, the combination with a slide having parallel tubes of a cross bar connecting the tubes; and a hand bar rotatively mounted on the cross bar.

3. In a trombone, the combination with a slide having parallel tubes of a cross bar connecting the tubes; and a tubular hand bar rotatively mounted on the cross bar.

4. In a trombone, the combination with a slide having parallel tubes of a cross bar between the tubes and rotatively mounted relatively to the tubes through an intermediate roller bearing.

5. In a trombone, the combination with a slide having parallel tubes of a cross bar connecting the tubes; a split sleeve rotatively mounted on the cross bar; and means securing the sleeve parts together.

6. In a trombone, the combination with a slide having parallel tubes of a cross bar connecting the tubes; a split sleeve rotatively mounted on the cross bar; and means securing the sleeve parts together comprising spring rings on the sleeves.

7. In a trombone, the combination with a slide having parallel tubes of a cross bar connecting the tubes; a split bearing sleeve on the cross bar; and a split tubular hand bar on the split sleeve.

8. In a trombone, the combination with a slide having parallel tubes of a cross bar connecting the tubes; a split bearing sleeve on the cross bar; a split tubular hand bar on the split sleeve; and a split roller bearing between the split sleeve and hand bar.

9. In a trombone, the combination with a slide having parallel tubes of a cross bar connecting the tubes; a split bearing sleeve on the cross bar; a split tubular hand bar on the split sleeve; a split roller bearing between the split sleeve and hand bar; and means for adjusting the roller bearing.

10. In a trombone, the combination with a slide having parallel tubes of a cross bar connecting the tubes; a split sleeve, on the cross bar, said split sleeve having cross slots; and split rings securing the parts of the split sleeve together, the slots assisting the assembly of the split rings.

11. In a trombone, the combination with a slide having parallel tubes of a cross bar connecting the tubes; race ways mounted on the cross bar; roller bearings between the race ways; a tubular hand bar over the race ways; and means securing the parts of the tubular hand bar together.

12. In a trombone, the combination with a slide having parallel tubes of a cross bar connecting the tubes; race ways mounted on the cross bar; roller bearings between the race ways; a tubular hand bar over the race ways; and means securing the parts of the tubular hand bar together, comprising spring rings.

13. In a trombone, the combination with a slide having parallel tubes of a connecting bar between the tubes having enlarged ends; a split bearing sleeve on the connecting bar between the enlarged ends, said sleeve having race ways and an exterior notch; split rings securing the sections of the bearing sleeve together, the exterior notch facilitating the assembly of the rings; exterior race ways; roller bearings between the race ways; a tubular hand bar on the outer race ways; spring rings securing the parts of the outer hand bar together; and a screw arranged in the outer hand bar adjusting the roller bearings.

In testimony whereof I have hereunto set my hand.

JOHN P. KOLAR.